(12) United States Patent
Borgeaud et al.

(10) Patent No.: US 6,257,376 B1
(45) Date of Patent: Jul. 10, 2001

(54) DISK FRICTION ASSEMBLY, IN PARTICULAR FOR HEAVY TRUCK

(75) Inventors: Olivier Borgeaud, Assieu; Didier Clement, Lyons, both of (FR)

(73) Assignee: Messier-Bugatti, Villacoublay (FR)

( * ) Notice: Subject to any disclaimer, the term of this patent is extended or adjusted under 35 U.S.C. 154(b) by 0 days.

(21) Appl. No.: 09/445,156

(22) PCT Filed: Jun. 5, 1998

(86) PCT No.: PCT/FR98/01146

§ 371 Date: Dec. 3, 1999

§ 102(e) Date: Dec. 3, 1999

(87) PCT Pub. No.: WO98/55776

PCT Pub. Date: Dec. 10, 1998

(30) Foreign Application Priority Data

Jun. 5, 1997 (FR) .................................... 97 06959

(51) Int. Cl.[7] .......................... F16D 55/36; F16D 65/04; F16D 65/78
(52) U.S. Cl. ................ 188/71.5; 168/18 A; 168/243; 168/264 A; 192/70.19; 192/113.21
(58) Field of Search ................. 192/113.21, 70.19; 188/18 A, 71.5, 73.1, 73.2, 73.31, 234, 242, 243, 244, 245, 264 A, 264 AA, 264 R (56) References Cited

U.S. PATENT DOCUMENTS

| 4,326,614 | * | 4/1982 | Matagrano | 192/70.19 |
| 5,101,940 | * | 4/1992 | Mungo et al. | 188/73.2 |
| 5,205,380 | | 4/1993 | Paquet et al. . | |
| 5,323,881 | * | 6/1994 | Machan et al. | 188/71.5 |
| 6,029,781 | * | 2/2000 | Carrier et al. | 188/71.5 |

FOREIGN PATENT DOCUMENTS

| 3740373 A1 | * | 6/1988 | (DE) . |
| 37 40 373 | | 6/1988 | (DE) . |
| 44 38 456 | | 5/1996 | (DE) . |
| 1 324 457 | | 7/1963 | (FR) . |
| 2 655 397 | | 6/1991 | (FR) . |
| WO 97/20150 | | 6/1997 | (WO) . |

* cited by examiner

Primary Examiner—Robert J. Oberleitner
Assistant Examiner—Robert A. Siconolfi
(74) Attorney, Agent, or Firm—Weingarten, Schurgin, Gagnebin & Hayes LLP (57) ABSTRACT

A rotor disk (20) is arranged between two stator disks (30, 40; 130, 140), the disks being made in thermostructural composite material at least for the wear parts. A first supporting structure (50, 150) has a bell shape with a bottom part (52) whereon rests the first stator disk (30, 130) and part of the skirt (70, 170) linked to the bottom part (52) and encloses the disks (20, 30, 40), the bell-shaped structure having cooling means (170, 174) for evacuating the heat generated by the mutual friction of the disks. A second supporting structure (80, 180) has a part in the shape of an annular support plate whereon rests the second stator disk (40, 140); and the bell-shaped structure bottom part (52) and the support plate (80, 180) are provided with cotters (60) or radial ribs (84) co-operating with the corresponding radial housings (36) formed in the outer surfaces (33, 44) of the stator disks (30, 40; 130, 140) to block the latter in rotation relative to the supporting structures (50, 150; 80, 180).

25 Claims, 10 Drawing Sheets

DISK FRICTION ASSEMBLY, IN PARTICULAR FOR HEAVY TRUCK

The present invention relates to a friction disk assembly, and more particularly to a friction assembly comprising a rotor disk interposed between two stator disks.

A particular intended field of application is that of brake, transmission, or retarder devices for motor vehicles, in particular heavy trucks.

Multidisk type brake devices made up of a plurality of stator disks alternating with rotor disks are well known. When such brake devices are installed on aircraft, the disks are now commonly made of a thermostructural composite material, and in particular of carbon/carbon (C/C) composite material. These materials have excellent mechanical properties and have the ability of conserving them up to high temperatures. In addition, they also provide very good friction behavior and a significant saving in mass compared with traditional metal disks.

Stator/rotor/stator (SRS) type disk brake devices using C/C composite materials have also been proposed for land vehicles, but until now use thereof has been limited to fields that are very special, for example Formula 1 motor racing. Reference can be made in particular to patent FR-A-2 655 397.

The saving in mass compared with metal disks and the performance of such devices encourage the idea of extending their use to other motor vehicles, in particular to heavy trucks, and not only for wheel brakes, but also for transmission brakes or "retarders".

The problem which then arises, and which the present invention seeks to solve, is that of making mounting and thrust structures for the stator disks which not only have the mechanical strength necessary for taking up braking forces, but which also enable the heat that is generated by the friction to be evacuated effectively, and for this to be possible over a period of time that can be very long compared with that which occurs on aircraft where braking can be intense, but is of short duration. With disks that are made at least in part out of thermostructural composite material, another difficulty to be overcome lies in the difference between the coefficients of thermal expansion of said material and of the metal used for the disk mounting and thrust structure.

To this end, the present invention provides a friction assembly of the type comprising: first and second stator disks each having an outer thrust face and an inner friction face, and a rotor disk disposed between the stator disks and having two friction faces, the disks being made of thermostructural composite material at least in the wear portions thereof adjacent to the friction faces; first and second thrust structures respectively for the outer thrust faces of the stator disks; and an actuator device designed to act on at least one of the thrust structures to cause the disks to be urged together, in which assembly, according to the invention:

the first thrust structure is bell-shaped, having an end wall portion against which the first stator disk bears and a skirt portion which is connected to the end wall portion and which surrounds the disks, the bell-shaped structure having cooling means to encourage evacuation of the heat produced by friction between the disks;

the second thrust structure has an annular plate-shaped thrust portion against which the second stator disk bears; and the end wall portion of the bell-shaped structure and the thrust plate are provided with radial ribs or keys which co-operate with corresponding radial housings formed in the outer faces of the stator disks so as to prevent them from rotating relative to the thrust structures.

Thus, a characteristic of the friction assembly lies in the way in which the stator disks are prevented from moving relative to the keys or ribs of the thrust structures which co-operate with corresponding housings in the form of radial grooves formed in the outside faces of the rotor disks. As a result, differential expansion between the disks and the thrust structures can be compensated by relative axial displacement. In addition, the transfer of heat to the thrust structures can be minimized, and it is possible to reduce the size of the keys or ribs and the housings so as to leave sheets of air in the gaps between the keys or ribs at the outside faces of the disks, thereby favoring ventilation of the friction device.

Another characteristic of the friction assembly lies in making a thrust structure in the form of a bell provided with cooling means. The cooling means can be constituted by ventilation openings, e.g. in the form of slots formed in the skirt portion, and/or cooling fins, e.g. formed at the periphery of the skirt. The bell-shaped structure is advantageously made as a single casting, e.g. of cast iron, thus making it easy to give it the required mechanical properties.

The friction assembly may also have a support structure with a ring-shaped portion connected to the skirt portion of the bell-shaped thrust structure, said support structure advantageously being provided with ventilation openings.

Evacuation of the heat produced by the friction can also be facilitated by providing ventilation channels in the disks, at least in the rotor disks. These channels open out at the outer ring of the disk and can extend as far as the inner ring of the disk, or they can be in the form of blind holes. It is also possible to form channels that branch so as to ensure that the ratio between the mass of composite material and the heat exchange area remains uniform throughout the volume of the disk. In addition, at least one of the disks can be made up of a plurality of sectors.

BRIEF DESCRIPTION OF THE DRAWINGS

Other features and advantages of the invention will appear on reading the following description given by way of non-limiting indication, and with reference to the accompanying drawings, in which.

Figure 1:
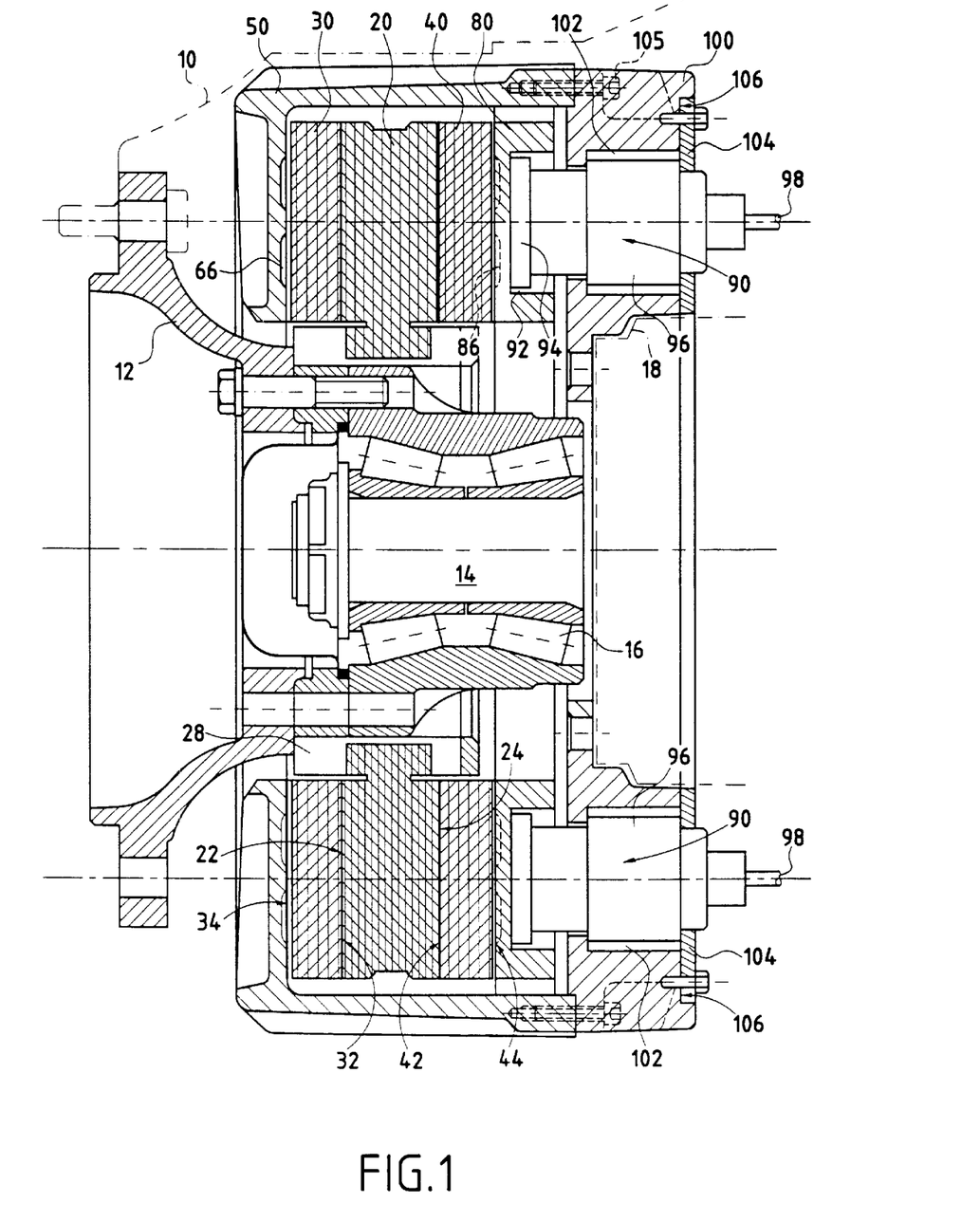
FIG. 1 is a fragmentary section view showing an embodiment of a wheel brake for a heavy truck constituting an implementation of a friction disk assembly of the invention.

FIG. 1 shows a front axle wheel of a heavy truck comprising in conventional manner a rim 10 fixed to a hub 12 which is mounted on a stub axle 14 via a bearing 16 having conical rollers.

The brake has a friction assembly comprising a rotor disk 20 placed between two stator disks 30 and 40, a bell-shaped thrust structure 50 against which the stator disk 30 bears, a thrust structure in the form of an annular plate 80 against which the stator disk 40 bears, actuators 90 acting on the plate 80, and a brake support 100 mounted on the axle carrier 18 carrying the stub axle 14.

The stator and rotor disks are rings on a common axis that are made of thermostructural composite material, either in full or at least in their friction portions or wear portions adjacent to the friction faces of the disks. In the latter case, the wear portions can be in the form of annular friction linings of thermostructural composite material fixed to respective cores of some other material.

Thermostructural composite materials are composite materials that possess mechanical properties making them suitable for constituting structural elements and which are capable of conserving these properties up to high temperatures. They are constituted by fiber reinforcement made of refractory fibers such as carbon fibers or ceramic fibers, which reinforcement is densified by a refractory matrix, such as a matrix that is also made of carbon or of ceramic. The thermostructural composite materials that are most commonly used for brake disks are carbon/carbon (C/C) materials where the fiber reinforcement and the matrix are both made of carbon. Proposals have also been made to use C/C—SiC materials where the matrix is a combined carbon and silicon carbide matrix. The SiC phase of the matrix can be obtained by chemical vapor infiltration or by partially siliciding the carbon matrix by impregnating the C/C material with molten silicon.

The rotor disk 20 (FIGS. 2 and 3) is an annular part constrained to rotate with the wheel that is to be braked. To this end, the disk 20 has crenellations 26 at its inside periphery or ring 20a that co-operate with corresponding housings formed at the periphery of a part or bowl 28 fixed on the hub 12.

Figure 2:
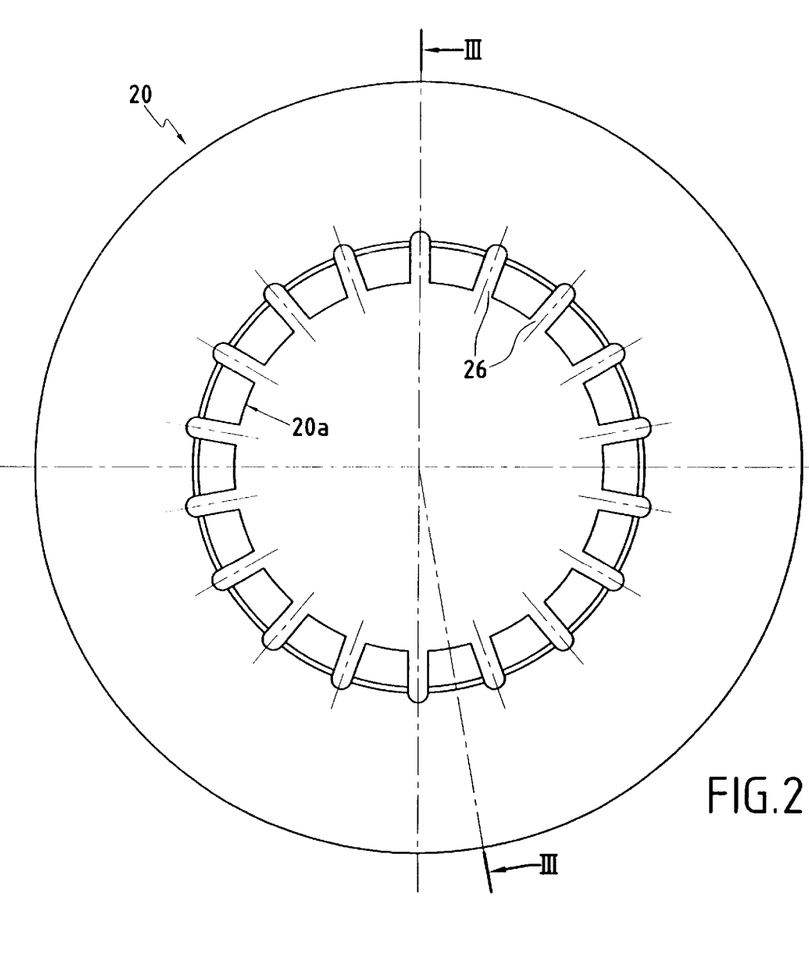
FIG. 2 is a front elevation view of the rotor disk of the FIG. 1 brake.
Figure 3:
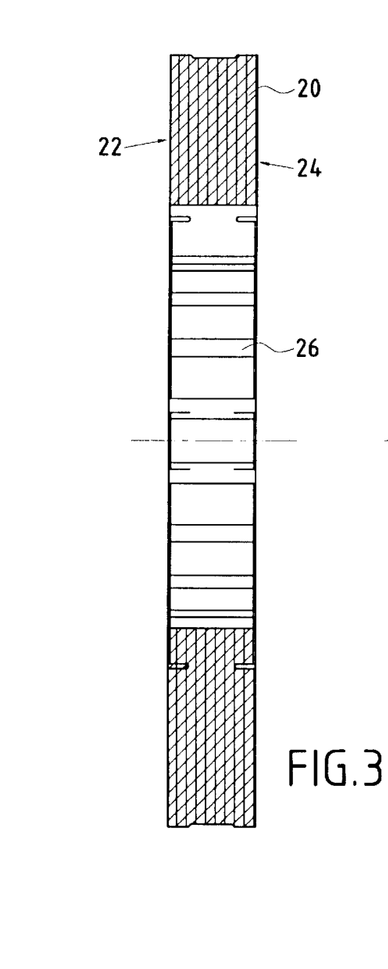
FIG. 3 is a section view on plane III—III of FIG. 2.

The rotor disk has two opposite friction faces 22 and 24 respectively adjacent to the friction faces 32 and 42 of the stator disks 30 and 40.

Each stator disk 30 and 40 is prevented from rotating relative to the brake support 100 by means of keys or grooves presented by the thrust structures 50 and 80, which co-operate with radial housings formed in the respective outside faces 34 and 44 of the stator disks.

Figure 4:
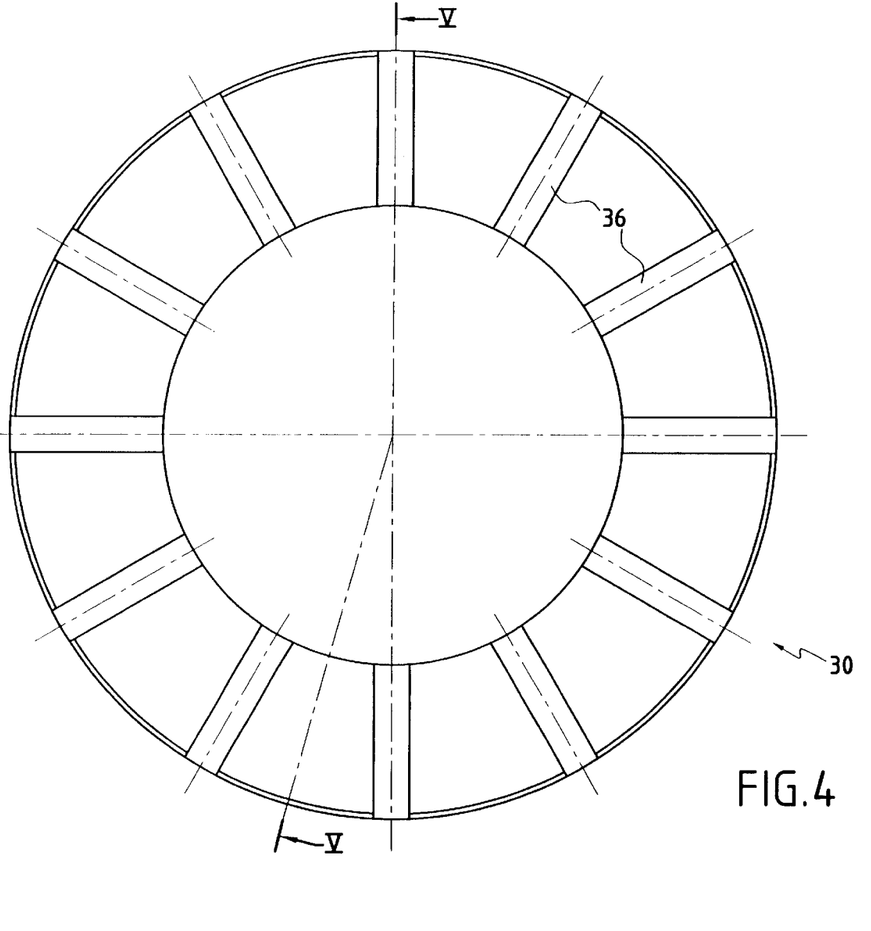
FIG. 4 is a front elevation view of a stator disk of the FIG. 1 brake.
Figure 5:
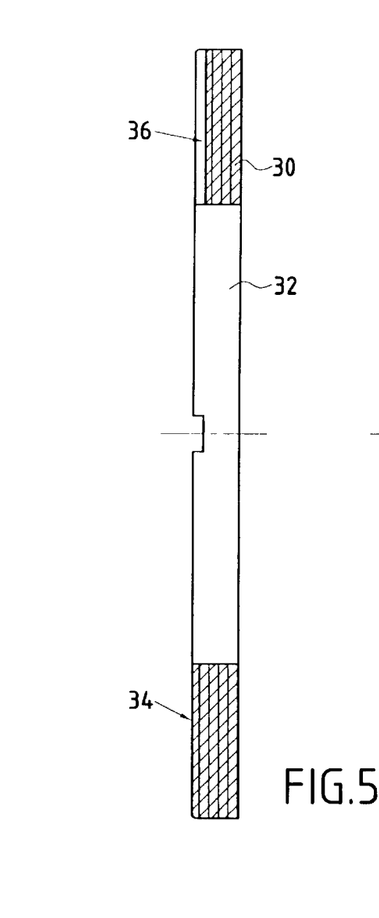
FIG. 5 is a section view on plane V—V of FIG. 4.

Since the disks 30 and 40 are identical, only the disk 30 is shown in greater detail in FIGS. 4 and 5. It can be seen that the housings 36 formed in the rear face 34 are in the form of radial grooves of constant width and are uniformly distributed around the axis of the disk.

In the embodiment shown, braking is produced by exerting an axial force on the outside face 44 of the stator disk 40 by means of actuators 90 and by means of the thrust plate 80 that constitutes an abutment plate. The stator disk 40 is mounted to move freely in an axial direction as is the rotor disk 20, such that under the force that is exerted, the rotor disk 20 is pressed between the two stator disks. It will be observed that the stator disk 30 can also be mounted to move freely axially. The axial thrust force is taken up by the bell-shaped thrust structure 50 shown in FIGS. 6 to 9.

This structure 50 is constituted by a casting, e.g. made of cast iron, comprising an annular end portion 52 having an annular skirt 70 connected thereto that surrounds the disks.

Figure 6:
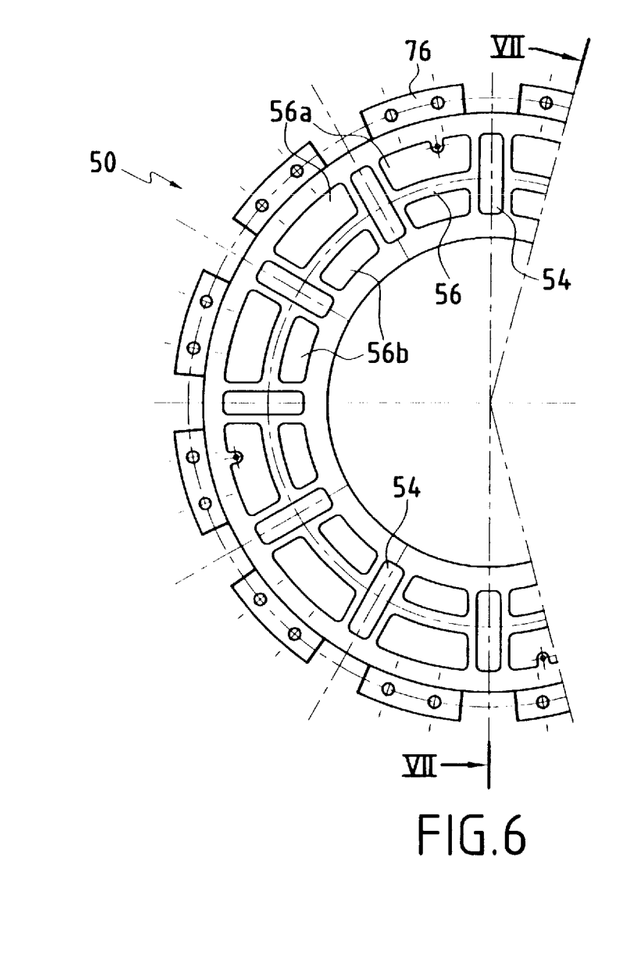
FIG. 6 is a fragmentary elevation view showing the internal thrust face of the bell-shaped thrust structure of the FIG. 1 brake.

Radial slots 54 uniformly distributed around the axis of the brake are formed through the end portion 52 in the same manner as the radial housings 36 in the outside face of the disk 30. A key 60 is mounted in each slot 54, which key is shown in the form of a perspective detail view on a larger scale in FIG. 7. Each key 60 has a base 62 which thrusts against a shoulder 54a of a slot 54, and a portion 64 which projects into the bell-shaped structure 50 through the slot 54 beyond the inside surface 56 of the end wall portion 52. It will be observed that on the outside, the annular end wall portion 52 has stiffening ribs 58 around its inner and outer peripheries, and also extending radially.

Figure 7:
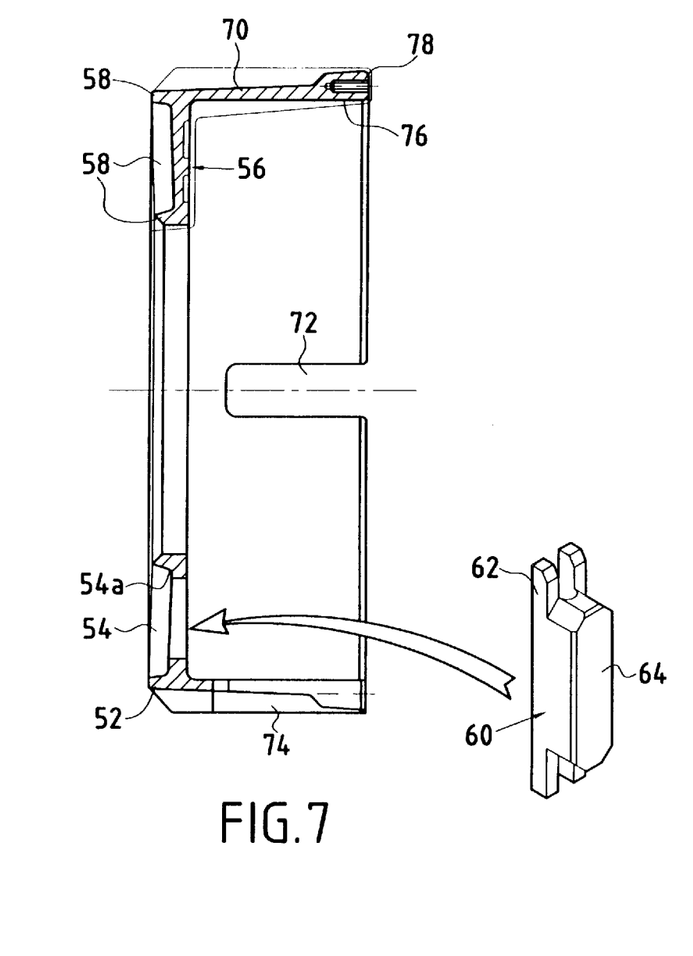
FIG. 7 is a section view on planes VII—VII of FIG. 6.
Figure 8:
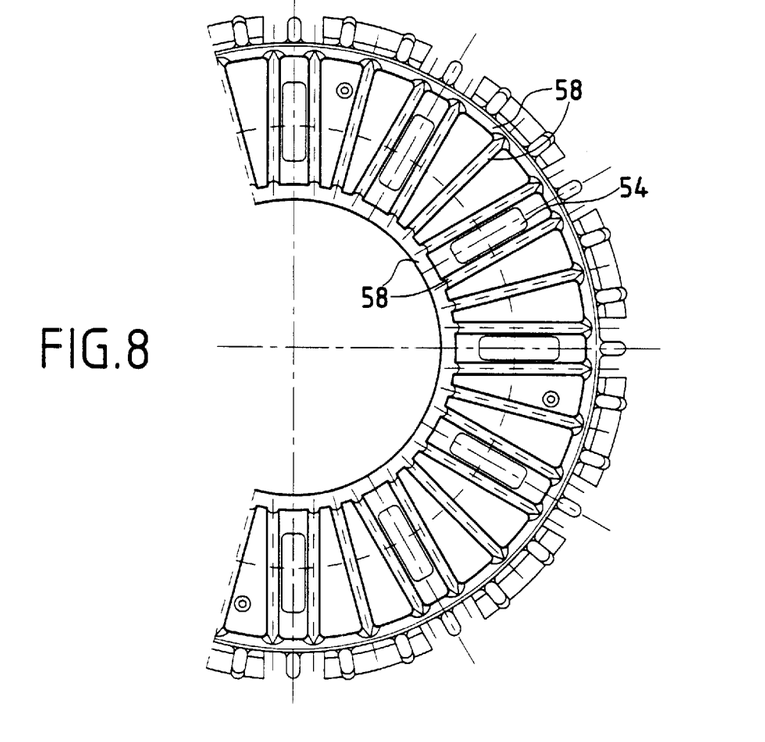
FIG. 8 is a fragmentary elevation view showing the external thrust face of the FIG. 6 thrust structure.
Figure 9:
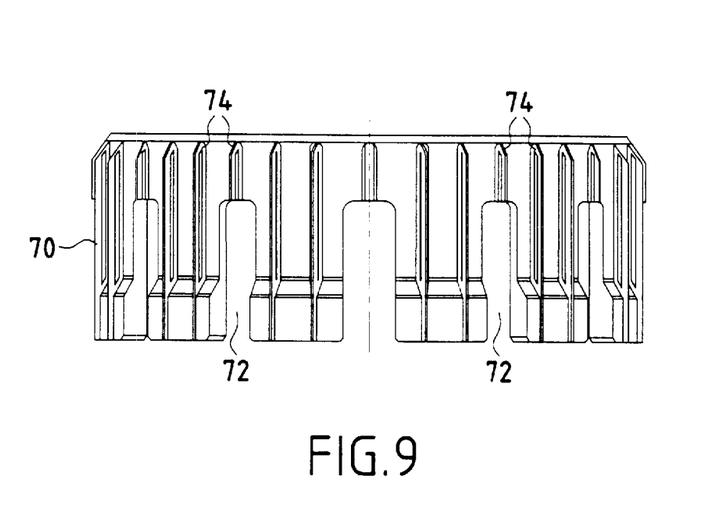
FIG. 9 is a side view showing the skirt portion of the FIG. 6 thrust structure.

At its periphery, the skirt 70 has a plurality of slots 72 (only one is shown in FIG. 7), which slots are formed through a portion of the length of the skirt starting from where it joins the end wall portion 52, and also a plurality of fins 74 integrally cast with the part 50. The slots 72 are uniformly distributed around the axis of the brake and constitute brake ventilation openings. The fins 74 which are formed parallel to the axis of the brake and which are distributed uniformly around said axis constitute cooling fins for enhancing the removal of the heat that is received by the part 50. It will be observed that the stiffening ribs 58 also constitute cooling fins.

Advantageously, the key portions 64 project into the structure 50 over a distance that is slightly greater than the depth of the radial housings 36 formed in the outside face 34 of the stator disk 30. As a result, a sheet of air 66 (FIG. 1) can be provided between the face 34 and the end wall surface 56 in the gaps between the keys 60. Recesses 56a and 56b formed in the end wall surface 56 between the slots 54 enable the volume of the air sheet 66 to be increased, thereby contributing to ventilating the brake.

At the free end of the skirt 70, there is formed a collar 76 in which there are formed bores 78 for connecting the thrust structure 50 to the brake support 100.

Figure 10:
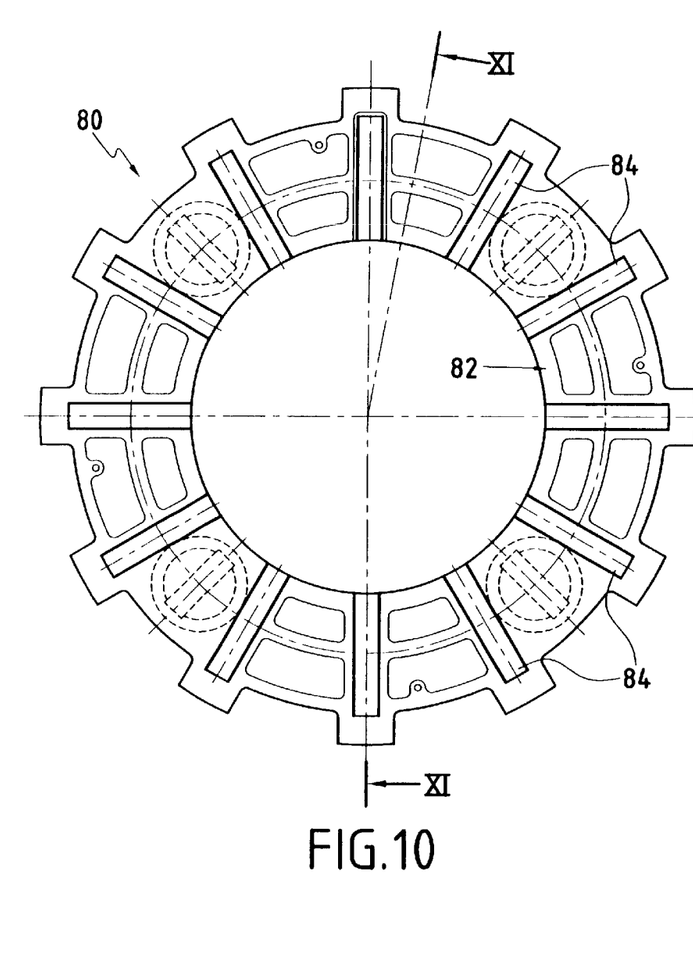
FIG. 10 is an elevation view showing the thrust face of the plate-shaped thrust structure of the FIG. 1 brake.
Figure 11:
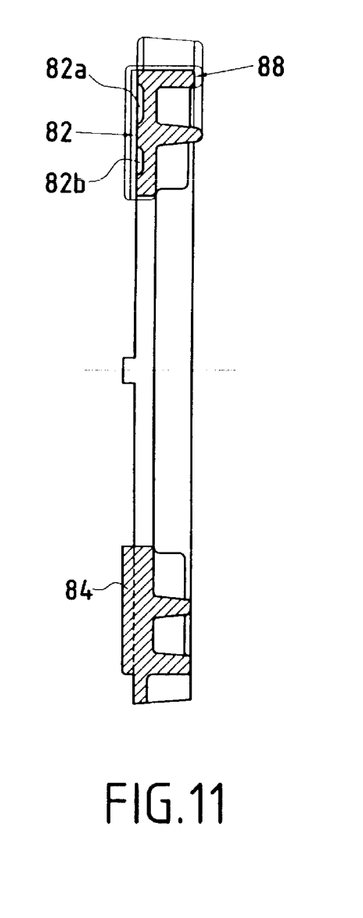
FIG. 11 is a section view on planes XI—XI of FIG. 10.

The annular thrust or bearing plate 80 (FIGS. 10 and 11) has radial ribs 84 on its face 82 facing towards the stator disk 40. The ribs 84 are uniformly distributed around the axis of the plate 80 in the same manner as the radial housings formed in the outside face 44 of the stator disk 40, and they are dimensioned in such a manner as to engage in the housings without circumferential play. The ribs 84 project over a distance that is slightly greater than the depth of the housings in the face 44 of the disk 40 so as to leave a thin sheet of air 86 (FIG. 1) between the face 82 and the face 44. Recesses 82a, 82b are formed in the face 82 of the plate 80 in the gaps between the ribs 84, thereby enabling the volume of the sheet of air 86 to be increased and to contribute to ventilating the brake. It will be observed that it is also possible to form slots through the plate 80 in the gaps between the ribs 84 so as to contribute further to cooling the brake.

On its outside face 88 opposite the face 82, the bearing plate 80 has housings 92 receiving the cylindrical heads 94 of actuators 90 (FIG. 1). By way of example, these actuators may be pistons driven by a hydraulic control fluid admitted into cylinders (not shown) in response to action being taken on a brake control member, in a manner that is well known per se.

The brake support 100 (FIGS. 12, 13) is an annular part provided with housings 102 for the actuators 90 and secured to the bell-shaped structure 50. It is preferably a single piece of metal, e.g. a casting of cast iron.

The housings 102 are in the form of through holes formed through the brake support ring. As shown in FIGS. 1 and 2, each actuator 90 has a cylinder 96 held between a shoulder of a housing 102 and an annular part 104 screwed to the outside face 106 of the brake support, i.e. the face opposite from its inside face 108 directed towards the structure 50. The head 94 of each actuator bears against the end wall of a housing 92 in the bearing plate. Ducts 98 connect each actuator 90 to a hydraulic control circuit (not shown). It will be observed that the actuators could also be controlled by means that are pneumatic or mechanical. A collar 101 at the periphery of the brake support has holes 103 providing linkage with the structure 50 by means of screws 105 (FIG. 1) screwed in the bores 78 at the end of the skirt portion 70.

Figure 12:
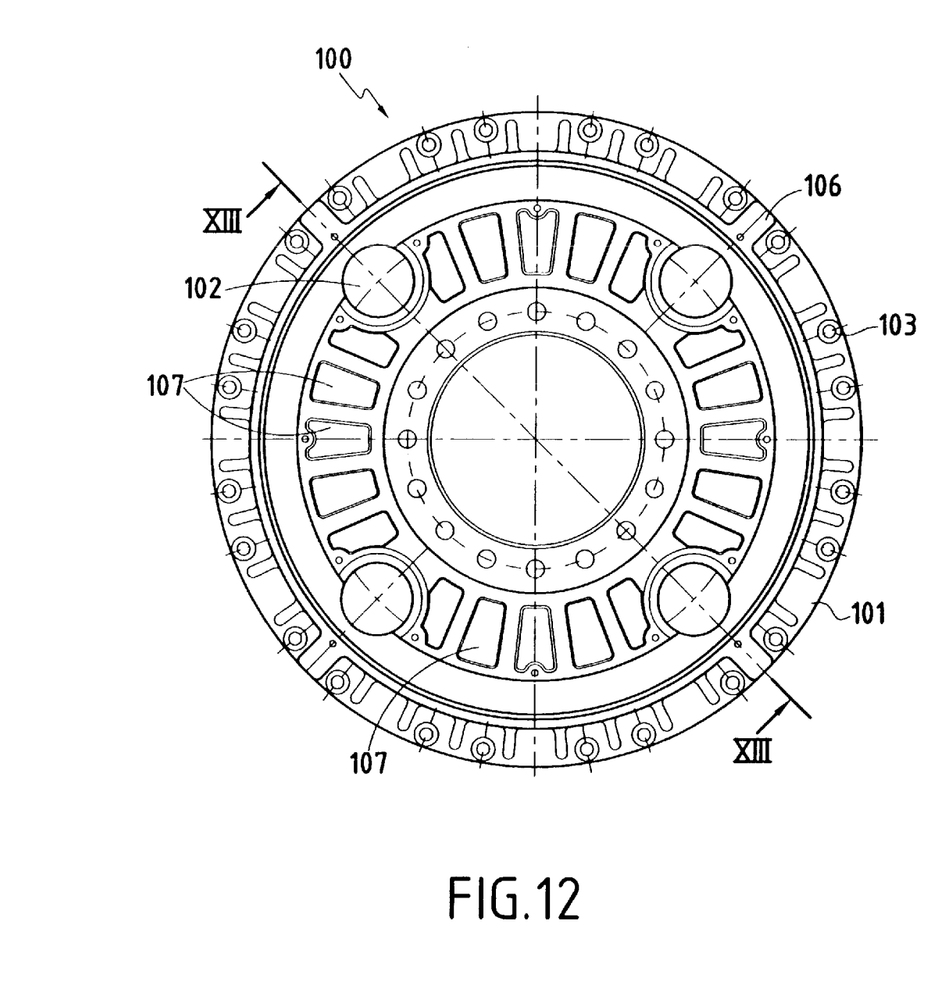
FIG. 12 is a face elevation view showing the brake support of the FIG. 1 brake.
Figure 13:
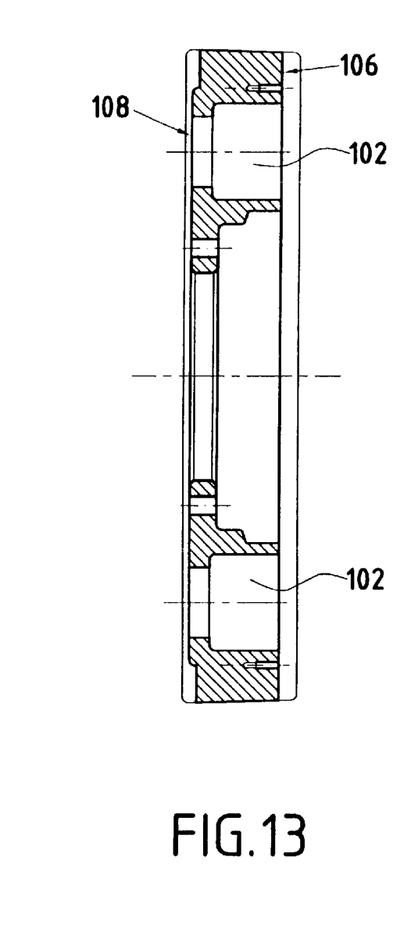
FIG. 13 is a section view on planes XIII—XIII of FIG. 12.

Slots 107 are formed through the brake support 100 to constitute ventilation openings that open out in the faces 108 and 106.

In the above-described brake device, ventilation and cooling are provided effectively because of the slots 72, 107, the sheets of air 66, 86, and the fins 74. In addition, the amount of heat produced by the disks rubbing against one another and that is transmitted into the metal parts is limited because of the small area of contact between the stator disks 30 and 40 and the thrust structures 50 and 80. Furthermore, this contact between keys or ribs and housings or grooves in the outside faces of the disks can accommodate differential expansion between the disks and the thrust structures by means of relative axial displacements.

An additional possibility for ventilating and cooling the disks consists in forming channels that open out in the outer ring of the disks. These can be channels formed by blind holes or by through holes connecting the outer ring to the inner ring.

Figure 14:
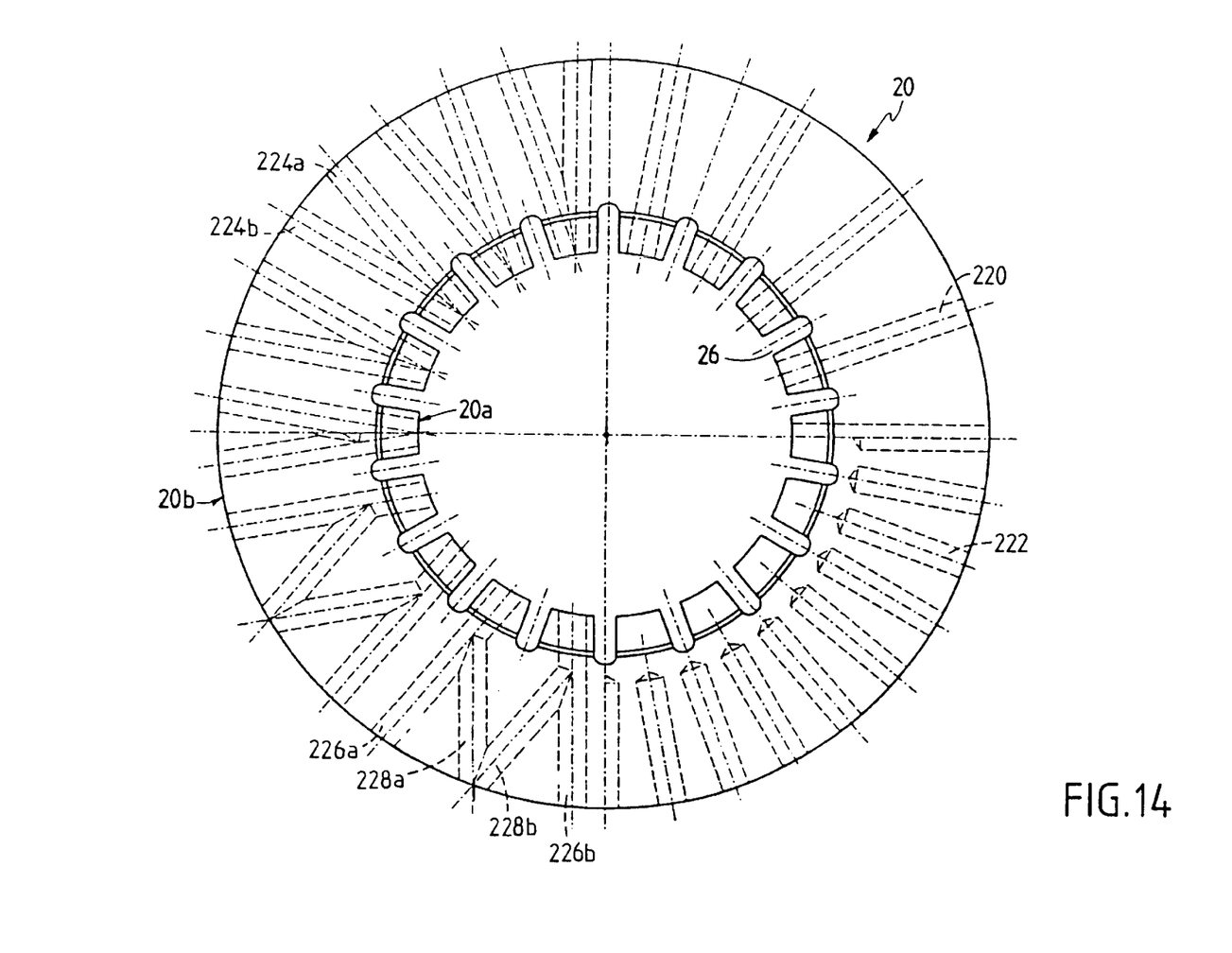
FIG. 14 shows various ways in which the ventilation channels can be implemented in the rotor disk of FIGS. 2 and 3.

FIG. 14 shows various possible shapes for the ventilation channels in the rotor disk 20. For simplification purposes, only four different embodiments are shown in the single figure, one embodiment per quadrant of the disk.

In a first embodiment, the channels 220 are radial drill holes open at each end, both in the inner ring 20a and in the outer ring 20b of the disk.

In a second embodiment, the channels 222 are radial blind drill holes that open out only into the outer ring 20b of the disk.

In a third embodiment, the channels are in pairs 224a, 224b. In each pair, they open out to distinct locations in the outer ring 20b of the disk and they converge towards each other so as to open out via a common orifice in the inner ring 20a of the disk.

Finally, in the fourth embodiment, the channels are in groups of four 226a, 226b, 228a, & 228b. In each group, two of the channels 226a, 226b open out at distinct locations in the outer ring 20b and in the inner ring 20a of the disk 20. The other two channels 128a, 128b open out via a common orifice in the outer ring of the disk, said orifice being situated between the orifices of the channels 226a and 226b and at equal distances therefrom, and they diverge so as to meet the channels 226a and 226b respectively inside the disks.

It will be observed that the orifices through which the channels open out in the inner ring of the disk (except for the channels 222) are situated at the tops of teeth between crenellations 26.

It will also be observed that the third and fourth embodiments make it possible to adjust the value of the ratio between mass of material and heat exchange area so that lack of uniformity in said ratio within the disk is reduced. In these embodiments, adjacent channels belonging to successive pairs of channels or groups of channels are parallel to each other.

Figure 15:
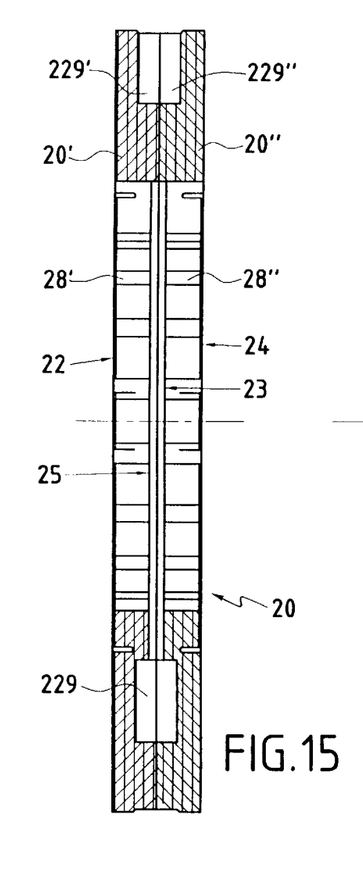
FIG. 15 is a meridian section view through a variant embodiment of a rotor disk in a friction disk assembly of the invention.
Figure 16:
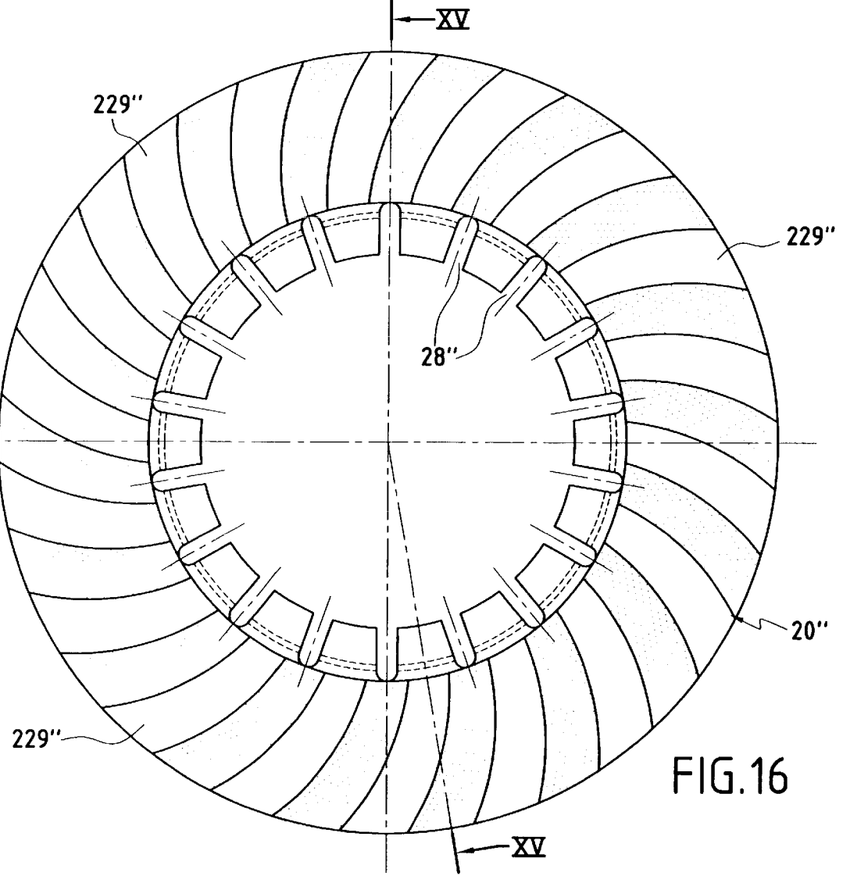
FIG. 16 is an inside face view of one of the half-disks of the FIG. 15 disk.

Another variant embodiment of a rotor disk 20 is shown in FIGS. 15 and 16. In this variant, the disk is made up of two adjacent half-disks 20' and 20" which are symmetrical to each other about their plane of mutual contact. Each half-disk 20' and 20" has crenellations 28', 28" in its inner ring for connection with a rotary member, a friction face 22 and 24, and an inner face 23, 25. Recesses 229', 229" are formed in the adjacent inner faces 23, 25 to constitute ventilation channels 229 which extend between the inner and outer rings of the disk.

As shown in FIG. 16, the channels 229 extend along curved paths and are of a width that increases slightly from the inner ring to the outer ring of the disk. As a result, air flow efficiency is improved and the ratio between the heat exchange area and the mass of material can be made substantially uniform throughout the volume of the disk. By making the rotor disk in the form of two adjacent half-disks, it is easy to machine channels having such shapes.

Figure 17:
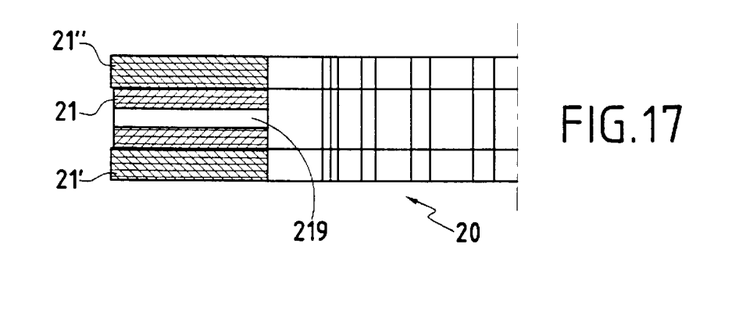
FIG. 17 is a meridian section view of another variant embodiment of the rotor disk in a friction disk assembly of the invention.

In yet another variant, shown in FIG. 17, the rotor disk 20 has an annular metal central core 21 and two annular friction portions 21', 21" on either side of the central core. The friction portions 21' and 21" are made of thermostructural composite material, e.g. C/C composite material. They can be provided with crenellations in their inner rings, as can the core 21, so as to connect with a rotary member. In this case, there is no need to connect the faces of the core to the facing faces of the friction portions. The core and the friction portions are then mounted to float in the axial direction, as described in document FR-A-2 615 259. Ventilation channels 219 can be formed in the metal core, likewise as described in that document. In a variant, it is possible to connect the friction portions to the metal core and to provide the rotary connection with the rotary member solely via the core.

Although the described application of a friction assembly of the invention relates to a brake device, such an assembly can also be used, as already mentioned, as a transmission device or a retarder device, likewise in a heavy truck.

Figure 18:
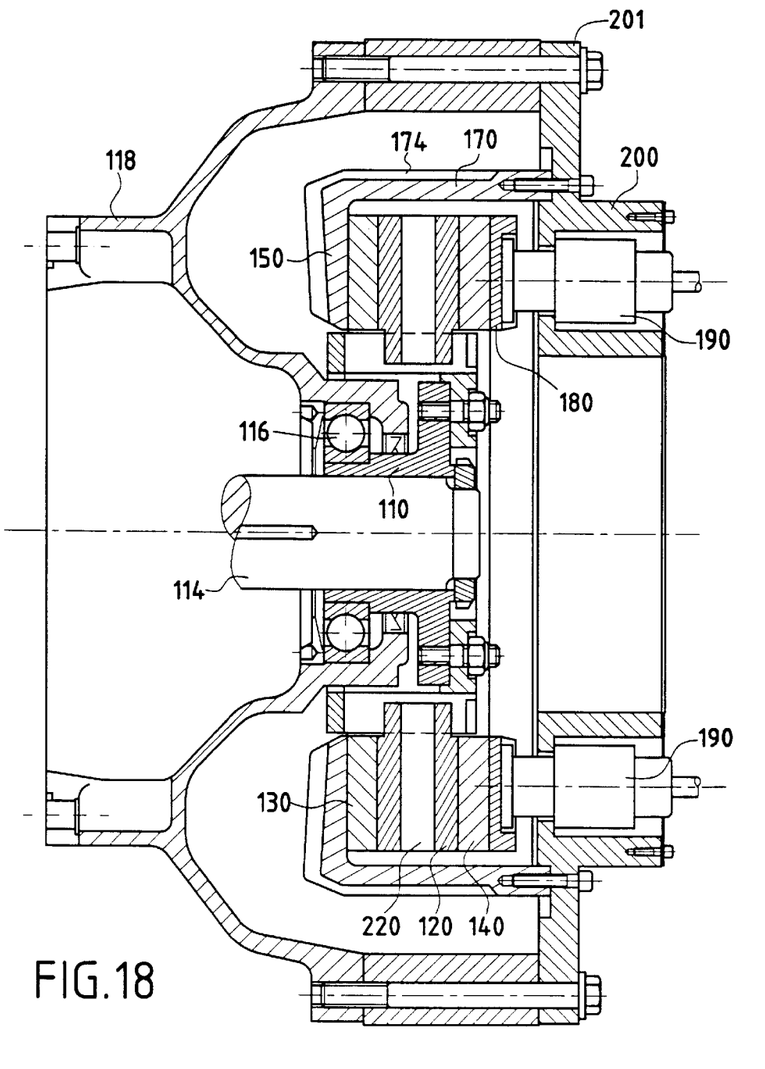
FIG. 18 is a fragmentary section view showing an embodiment of a truck transmission constituting an implementation of a friction disk assembly of the invention.

A transmission retarder is shown highly diagrammatically in FIG. 18.

There can be seen a friction assembly very similar to that of the brake shown in FIGS. 1 to 13, with a rotor disk 120 situated between two stator disks 130 and 140, which disks are identical to those shown in FIGS. 2 to 5.

A first bell-shaped thrust structure 150 co-operates with the outer face of the stator disk 130, while a second thrust structure 180 in the form of an annular plate co-operates with the outer face of the stator disk 140. The connections between the end wall portion of the bell 150 and the disk 130, and between the thrust face of the plate 180 and the disk 140 are made respectively by means of keys and grooves (not shown) which co-operate with radial grooves formed in the outer faces of the disks 130 and 140, while leaving sheets of air, as described above.

The bell 150 is a metal casting having a skirt portion 170 provided with cooling fins 174 and with ventilation slots (not shown). At its end, the skirt 170 is connected to a brake support 200. Actuators 190 are mounted in the brake support to act axially against the outer face of the thrust structure 180 that forms a bearing plate.

The brake support 200 is also connected at its periphery via fixing lugs 201 to a bowl-shaped support structure 118 which is mounted on a transmission shaft 114 by means of bearings 116. The inner crenellations of the rotor disk 120 engage a ring 110 constrained to rotate with the shaft 114.

The operation of the transmission brake is identical to that of the wheel brake as described above. As also mentioned above, the rotor can be provided with ventilation channels 220 and/or can be built up from a plurality of portions.

What is claimed is:

1. A friction disk assembly comprising: first and second stator disks each having an outer thrust face and an inner friction face, and a rotor disk disposed between the stator disks and having two friction faces, the disks being made of thermostructural composite material at least in the wear portions thereof adjacent to the friction faces; first and second thrust structures respectively for the outer thrust faces of the stator disks; and an actuator device designed to act on at least one of the thrust structures to cause the disks to be urged together, the assembly being characterized in that:
the first thrust structure is bell-shaped, having an end wall portion against which the first stator disk bears and a skirt portion which is connected to the end wall portion and which surrounds the disks, the bell-shaped structure having cooling means to encourage evacuation of the heat produced by friction between the disks;
the second thrust structure has an annular plate-shaped thrust portion against which the second stator disk bears; and
the end wall portion of the bell-shaped structure and the thrust plate are provided with radial ribs or keys which co-operate with corresponding radial housings formed in the outer faces of the stator disks so as to prevent them from rotating relative to the thrust structures.

2. A friction assembly according to claim 1, characterized in that the cooling means comprise ventilation openings formed in the bell-shaped structure.

3. A friction assembly according to claim 2, characterized in that the openings are in the form of slots formed through the skirt portion.

4. A friction assembly according to claim 1, characterized in that the cooling means comprise fins.

5. A friction assembly according to claim 4, characterized in that the fins are formed at the periphery of the skirt portion.

6. A friction assembly according to claim 1, characterized in that the bell-shaped structure is constituted by a metal casting.

7. A friction assembly according to claim 1, characterized in that the end wall portion of the bell-shaped structure is fitted with keys mounted in radial housings of the end wall portion.

8. A friction assembly according to claim 1, characterized in that the outer faces of the stator disks bear against the end wall portion of the bell-shaped structure and against the thrust plate by contact between the radial ribs or keys and the bottoms of the corresponding radial housings, leaving room for sheets of air in the gaps between the radial ribs or keys.

9. A friction assembly according to claim 1, characterized in that it further includes a support structure having a ring-shaped portion which is connected to the skirt portion of the bell-shaped thrust structure.

10. A friction assembly according to claim 9, characterized in that the support structure is provided with ventilation openings.

11. A friction assembly according to claim 1, characterized in that at least one of the disks is made up of a plurality of sectors.

12. A friction assembly according to claim 1, characterized in that at least the rotor disk has ventilation channels.

13. A friction assembly according to claim 12, characterized in that ventilation channels cause the outer ring of the disk to communicate with the inner ring of the disk.

14. A friction assembly according to claim 13, characterized in that the ventilation channels comprise pairs of channels each made up of two channels which open out via separate orifices in the outer ring of the disk and which converge towards each other so as to open out via a common orifice in the inner ring of the disk.

15. A friction assembly according to claim 13, characterized in that the ventilation channels comprise sets of channels each made up of distinct first and second channels connecting the outer ring of the disk to the inner ring of the disk, and third and fourth channels which open out via a common orifice in the outer ring of the disk between the first and second channels, and which diverge away from each other so as to join the first and second channels, respectively.

16. A friction assembly according to claim 12, characterized in that at least the rotor disk has blind ventilation channels opening out into the outer ring of the disk.

17. A friction assembly according to claim 1, characterized in that the rotor disk is made up of two adjacent half-disks.

18. A friction assembly according to claim 17, characterized in that grooves are formed in the facing faces of the half-disks to constitute ventilation channels.

19. A friction assembly according to claim 1, characterized in that each rotor disk comprises a central metal core and two friction portions situated on either side of the metal core and made of thermostructural composite material.

20. A brake device, in particular for a heavy truck, characterized in that it includes at least one friction assembly according to claim 1.

21. A transmission device, in particular for a heavy truck, characterized in that it includes at least one friction assembly according to claim 1.

22. A retarder device, in particular for a heavy truck, characterized in that it includes at least one friction assembly according to claim 1.

23. A friction assembly according to claim 3, characterized in that:
the cooling means comprise fins formed at the periphery of the skirt portion;
the bell-shaped structure is constituted by a metal casting and the end wall portion of the bell-shaped structure is fitted with keys mounted in radial housings of the end wall portion;
the outer faces of the stator disks bear against the end wall portion of the bell-shaped structure and against the thrust plate by contact between the radial ribs or keys and the bottoms of the corresponding radial housings, leaving room for sheets of air in the gaps between the radial ribs or keys;

a support structure is provided having ventilation openings and a ring-shaped portion which is connected to the skirt portion of the bell-shaped thrust structure; at least one of the disks is made up of a plurality of sectors and at least the rotor disk has ventilation channels;

ventilation channels cause the outer ring of the disk to communicate with the inner ring of the disk;

the ventilation channels comprise one of:

pairs of channels each made up of two channels which open out via separate orifices in the outer ring of the disk and which converge towards each other so as to open out via a common orifice in the inner ring of the disk; and sets of channels each made up of distinct first and second channels connecting the outer ring of the disk to the inner ring of the disk, and third and fourth channels which open out via a common orifice in the outer ring of the disk between the first and second channels, and which diverge away from each other so as to join the first and second channels, respectively;

at least the rotor disk has blind ventilation channels opening out into the outer ring of the disk;

each rotor disk comprises a central metal core and two friction portions situated on either side of the metal core and made of thermostructural composite material.

24. A friction assembly according to claim 23, characterized in that the rotor disk is made up of two adjacent half-disks and grooves are formed in the facing faces of the half-disks to constitute ventilation channels.

25. A friction assembly according to claim 23 and further including one of a brake device, transmission device and retarder device for a heavy truck.

* * * * *